United States Patent [19]

Sorkin

[11] Patent Number: 5,788,398
[45] Date of Patent: Aug. 4, 1998

[54] CONNECTOR SEAL FOR AN ANCHOR AND A CORROSION-PROTECTION TUBE OF A POST-TENSION SYSTEM

[76] Inventor: Felix L. Sorkin, P.O. Box 1503, Stafford, Tex. 77477

[21] Appl. No.: 677,076

[22] Filed: Jul. 9, 1996

[51] Int. Cl.⁶ .................................................. B25G 3/00
[52] U.S. Cl. ........................... 403/300; 403/51; 403/288; 403/305; 285/138; 285/177; 52/223.13
[58] Field of Search ........................ 403/50, 51, 288, 403/300, 305; 285/138, 177; 52/223.13

[56] References Cited

U.S. PATENT DOCUMENTS

| | | | |
|---|---|---|---|
| 2,562,294 | 7/1951 | Cahenzli, Jr. | 285/177 |
| 2,958,548 | 11/1960 | De Vienne et al. | 285/177 X |
| 3,381,982 | 5/1968 | Elek | 285/177 X |
| 3,680,894 | 8/1972 | Young | 285/177 X |
| 3,690,703 | 9/1972 | Phillipps | 285/177 |
| 4,318,547 | 3/1982 | Ericson | 285/177 X |
| 4,719,658 | 1/1988 | Kriofske | 52/223.13 |
| 4,918,887 | 4/1990 | Davis et al. | 52/223.13 |
| 5,072,558 | 12/1991 | Sorkin et al. | 52/230 |
| 5,079,879 | 1/1992 | Rodriguez | 52/223.13 |
| 5,271,199 | 12/1993 | Northern | 52/223.13 |
| 5,440,842 | 8/1995 | Sorkin | 52/223.13 |
| 5,458,379 | 10/1995 | Hamada et al. | 285/177 X |

*Primary Examiner*—Kenneth J. Dorner
*Assistant Examiner*—Bruce A. Lev

[57] ABSTRACT

A connector for joining a corrosion-protection tube to an anchor of a tendon of a post-tension system including a body formed of an elastomeric material and a seal formed interior of the body. The body has a first receptacle formed at one end thereof for attachment to an end of the anchor. The body has a second receptacle formed at an opposite end thereof for attachment to an end of the corrosion-protection tube. The seal is positioned between the first receptacle and the second receptacle so as to form a liquid-tight seal with a surface of the tendon passing therethrough. The first receptacle is an orifice that has a diameter suitable for liquid-tight engagement with an end of the anchor. The second receptacle is an opening formed in the opposite end of the body and has a diameter suitable for liquid-tight engagement with an exterior surface of the corrosion-protection tube. The orifice and the opening are coaxial. The seal is a membrane which extends transverse to a longitudinal axis of the body. The membrane has a central area with a diameter less than an outer diameter of the tendon. The central area is a hole formed in the membrane.

9 Claims, 2 Drawing Sheets

5,788,398

1

CONNECTOR SEAL FOR AN ANCHOR AND A CORROSION-PROTECTION TUBE OF A POST-TENSION SYSTEM

TECHNICAL FIELD

The present invention relates to connectors and seals used in post-tension systems. More particularly, the present invention relates to seals for retaining a corrosion-inhibitor material within an interior of a corrosion-protection tube. Furthermore, the present invention relates to connectors for joining a corrosion-protection tube to a tubular extension of an anchor used in a post-tension system.

BACKGROUND ART

In conventional post-tensioning systems, a tendon is affixed in tension, onto an anchor. In conventional practice, the tendon has a polymeric coating or sheathing extending over the exterior of the tendon. When it is necessary to tension the tendon, a portion of the sheathing is removed from the exterior of the tendon so as to allow the tensioning apparatus to appropriately stress the end of the tendon. When a portion of the sheathing is removed, the exposed end of the tendon can be corroded by the elements. As a result, corrosion will occur over time unless appropriate steps are taken so as to prevent corrosion from occurring. This corrosion can result in damage or deterioration in the post-tension system.

An initial attempt to prevent corrosion was the practice of extending a tubular member from the end of the anchor over the exposed portion of the tendon. This tubular member is often known as a "transition piece", a "trombone slide", or a "corrosion-protection tube". The corrosion-protection tube is forced over and onto a tubular extension extending outwardly of a polymeric encapsulation surrounding the steel anchor. This "interference fit" engagement between the corrosion-protection tube and the tubular portion of the anchor serves to resist water intrusion thereinto. Unfortunately, the corrosion-protection tube is often poorly or loosely attached to the tubular portion of the anchor. As a result, it is possible for water intrusion to enter the interior of the corrosion-protection tube.

Also, in normal practice, a seal is formed or placed at an end of the tubular member opposite the anchor. The seal is intended to create a water-tight seal between the outer diameter of the sheathing of the tendon and the inner diameter of the corrosion-protection tube. An example of such a seal is described in U.S. patent application Ser. No. 08/630,444, filed on Apr. 10, 1996, by the present inventor. This patent application describes a seal for the end of the tendon opposite the anchor which includes a cap having a tubular body and a surface extending across the end of the tubular body. The cap includes a corrosion-resistant material contained within the interior area of the cap. The surface closes the end of the tubular body. This surface has a frangible area formed thereon. The surface extends transverse to the longitudinal axis of the tubular body at one end of the tubular body. The frangible area has a thickness less than a thickness of a non-frangible remainder of the surface. This cap is formed of a polymeric material. The surface is formed of a deformable polymeric material such that the non-frangible portion of the surface forms a liquid-tight seal with an outer diameter of a tendon extending through the surface. The corrosion-resistant material that is contained within the cap is of a suitable volume so as to fill a void in the corrosion-protection tube between the inner diameter of the tubular member and the outer diameter of the tendon extending therethrough.

2

In practice, the use of this corrosion inhibitor retaining seal has been very successful in filling the area between the surface of the corrosion-protection tube and the exterior surface of the tendon. However, practice has shown that the use of the corrosion-inhibitor fluid, usually grease, is somewhat messy to deal with. Leakage of the corrosion-protection material can occur at the opposite end of the corrosion-protection tube, specifically at the juncture of the corrosion-protection tube with the tubular extension of the anchor. As such, a need has developed so as to avoid the mess and leakage that can occur through the use of the corrosion-inhibitor material.

In practice, the corrosion-protection tube is normally affixed to the exterior of the tubular extension of the encapsulation of the anchor. As a result, the corrosion-protection tube required a diameter suitable for fitting over the exterior of this tubular extension. However, for the purposes of enhancing the capabilities of the corrosion-protection tube, it is desirable to minimize the diameter of the corrosion-protection tube. As a result of minimizing the diameter of the corrosion-protection tube, the volume between the interior surface of the corrosion-protection tube and the exterior surface of the tendon is minimized. Also, the amount of the corrosion-inhibitor material is also minimized. As a result, it is desirable to minimize the diameter of the corrosion-protection tube as much as practicable.

It is an object of the present invention to provide a connector which serves to retain corrosion-inhibitor material within the interior of a corrosion-protection tube.

It is another object of the present invention to provide a connector which effectively joins a corrosion-protection tube to a tubular extension of an anchor.

It is a further object of the present invention to provide a connector which effects a positive seal over an exterior surface of a tendon extending through the corrosion-protection tube and into the anchor.

It is a further object of the present invention to provide a connector which minimizes the diameter of the corrosion-protection tube.

It is still a further object of the present invention to provide a connector for joining the corrosion-protection tube to an anchor which is easy to manufacture, relatively inexpensive, and easy to use.

These and other objects and advantages of the present invention will become apparent from a reading of the attached specification and appended claims.

SUMMARY OF THE INVENTION

The present invention is a connector for joining a corrosion-protection tube to an anchor of a tendon of a post-tension system comprising a body formed of an elastomeric material and having a first receptacle formed at one end thereof and a second receptacle formed at an opposite end thereof. The first receptacle is suitable for attachment to a tubular extension of the anchor. The second receptacle is suitable for attachment to an end of the corrosion-protection tube. A seal is formed interior of the body generally between the first receptacle and the second receptacle. The seal serves to form a generally liquid-tight seal with a surface of a tendon passing therethrough. The first receptacle is an orifice formed in one end of the body. The orifice has a diameter suitable for liquid-tight engagement with the tubular extension of the anchor. The orifice has a diameter greater than a diameter of the tendon. The second receptacle is an opening formed in the opposite end of the body. The opening has a diameter suitable for liquid-tight engagement with an exterior surface of the corrosion-protection tube. The orifice and the opening in the body are coaxial. The orifice has a larger diameter than the opening.

The seal is a membrane which is formed interior of the body and extends transverse to a longitudinal axis of the body. The membrane has a central area with a diameter less than an outer diameter of the tendon. The central area is, specifically, a hole formed in the membrane. The present invention is also the post-tension system which employs the connector for joining a a corrosion-protection tube to the tubular extension of an encapsulated anchor.

DETAILED DESCRIPTION OF THE INVENTION

Figure 1:
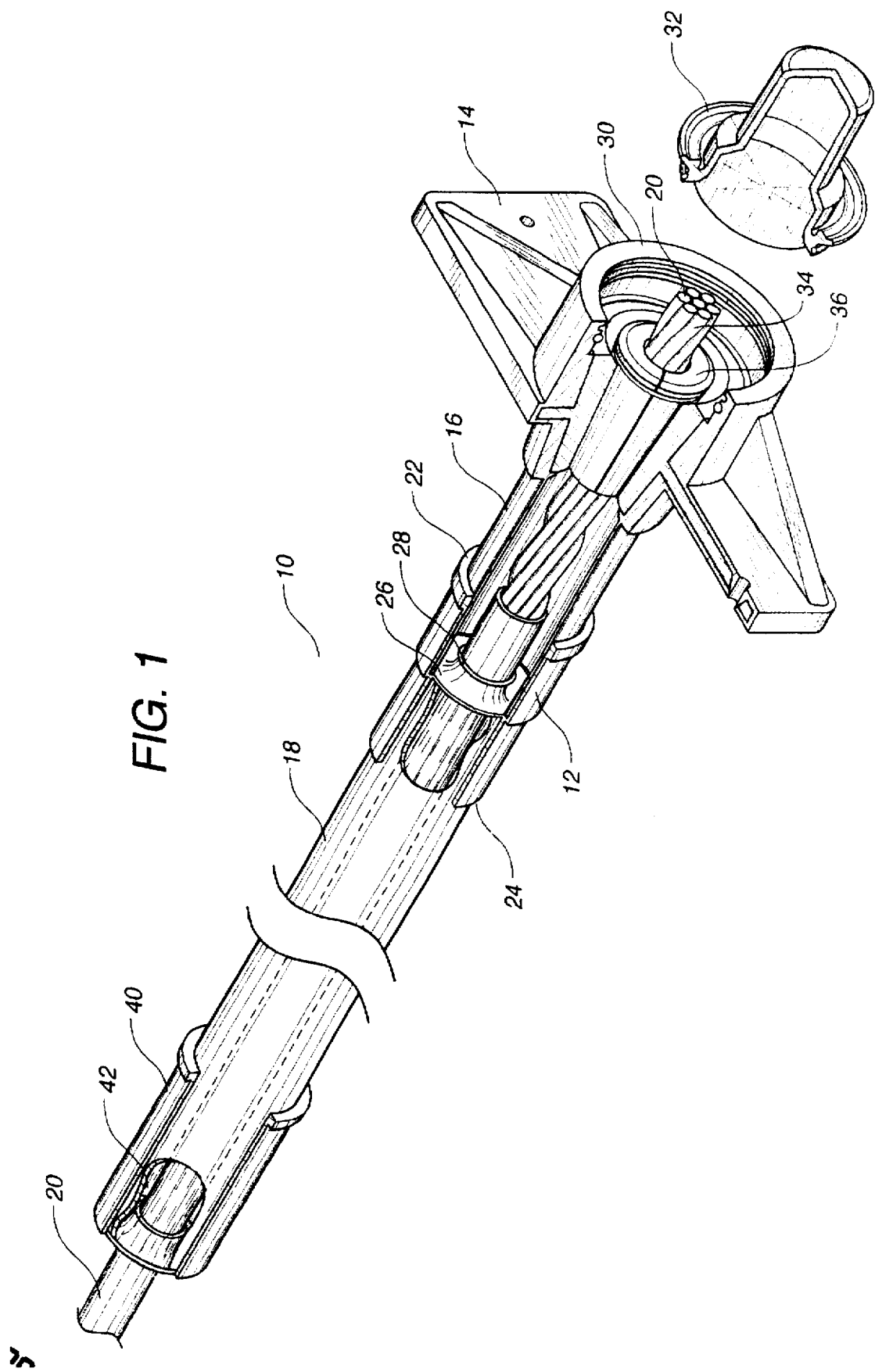
FIG. 1 is a perspective, partially quarter-sectional view of the post-tension system employing the connector of the present invention.

Referring to FIG. 1, there is shown at 10 the post-tension system employing the connector 12 of the present invention. In particular, the post-tension system 10 includes an anchor 14 having a tubular portion 16 extending outwardly therefrom, a corrosion-protection tube 18, and a tendon 20 extending through the corrosion-protection tube 18 and through the tubular portion 16 of the anchor 14. As can be seen, the connector 12 joins the tubular portion 16 of the anchor 14 to an end of the corrosion-protection tube 18.

As shown in FIG. 1, the connector 12 includes a first receptacle 22 which is formed in one end and a second receptacle 24 formed in an opposite end. The first receptacle 22 serves to receive the tubular portion 16 of the anchor 14. The second receptacle 24 serves to receive the corrosion-protection tube 18 therein. As can be seen, the tendon 20 extends through the interior of the connector 12. A seal 26 is formed in the interior of the connector 12. The seal 26 serves to form a generally liquid-tight seal with the exterior surface of the tendon 20. In particular, the seal 26 is a membrane which is formed in the connector 12 and extends transversely to a longitudinal axis of the connector 12. The membrane which forms the seal 26 has a central area 28 through which the tendon 20 passes. The seal 26, the first receptacle 22 and the second receptacle 24 are integrally formed together of an elastomeric material. The membrane 26 is interposed between an end of the corrosion-protection tube 18 and an end of the tubular portion 16 of the anchor 14. The first receptacle 22 is affixed in liquid-tight relationship onto the tubular portion 16. Similarly, the second receptacle 24 is affixed in liquid-tight relationship onto the exterior surface of the corrosion-protection tube 18.

In FIG. 1, it can be seen that the anchor 14 is an encapsulated anchor. The encapsulation is made of a polymeric material. The polymeric material is formed so as to have the tubular portion 16 extending outwardly therefrom. A forward cylindrical portion 30 is also formed on the anchor 14. This forward portion 30 serves to receive a sealing cap 32 therein. The sealing cap can be snap-fitted or threadedly affixed within the cylindrical portion 30 of the anchor 14. It can be seen that the tendon 20 includes an unsheathed portion 34 which extends outwardly from the interior of the anchor 14. Typically, the unsheathed portion 34 will be tensioned during the installation of the post-tension system. Wedges 36 are installed, in a conventional fashion, into the interior of the anchor 14 so as to retain the tendon 20 in its properly tensioned condition. The tendon 20 extends through the interior of the anchor 14 and through the interior of the tubular portion 16. As shown in FIG. 1, the sheathed portion of the tendon 20 extends slightly into the interior of the tubular portion 16.

The corrosion-protection tube 18 is a polymeric tube which extends from the end of the tubular portion 16 of the anchor 14. The corrosion-protection tube 18 extends along the length of the tendon 20 for a desired distance. The connector 12 is affixed to one end of the tube 18. A seal 40 is affixed to the opposite end of the corrosion-protection tube 18. The seal 40 has a configuration similar to that described in U.S. patent application Ser. No. 08/630,444, filed on Apr. 10, 1996, by the present inventor, and entitled "CORROSION INHIBITOR RETAINING SEAL". A description of the seal 40 is described herein previously under the "Background Art". A corrosion inhibitor material 42 will fill the space between the exterior surface of the tendon 20 and the interior surface of the corrosion-protection tube 18. As such, the combination of the corrosion-protection tube 18 with the corrosion inhibitor chemical will prevent water intrusion from corroding or destroying the integrity of the tendon 20.

During installation of the connector 12 of the present invention, it is first necessary to slidably affix the second receptacle 24 onto the end of the corrosion-protection tube 18.

The corrosion-protection tube 18, along with the seal 40 and the connector 12, slides over the unsheathed portion 34 and the sheathed portion of the tendon 20 so as to reside in a position slightly beyond the unsheathed portion. The unsheathed portion 34 can then be passed through the interior of the anchor 24 so as to be in a proper position for tensioning. Once tensioning occurs, the corrosion-protection tube 18 can be pushed forward, along the tendon 20, such that the first receptacle 22 will engage the exterior surface of the tubular portion 16 in liquid-tight engagement. At the same time, the seal 26 will form a generally liquid-tight seal with the exterior surface of the tendon 20. The arrangement of the connector 12 will prevent the corrosion inhibitor fluid 42 from seeping or leaking from the area of the joinder of the corrosion-protection tube 18 with the tendon 20. This is caused by the fact that it is not necessary to slide the end of the corrosion-protection tube 18 over the exterior surface of the tubular portion 16 of the anchor 14. Additionally, since the corrosion-protection tube 18 does not slide over the exterior surface of the tubular portion 16, the corrosion-protection tube 18 can be manufactured of a minimal diameter. As can be seen in FIG. 1, the first receptacle 22 has a larger diameter than the second receptacle 24. The combination of the connector 12 with the seal 40 more effectively prevents water intrusion into the interior of the corrosion-protection tube 18 while, at the same time, containing the corrosion inhibitor material on the interior of the corrosion-protection tube 18.

Figure 2:
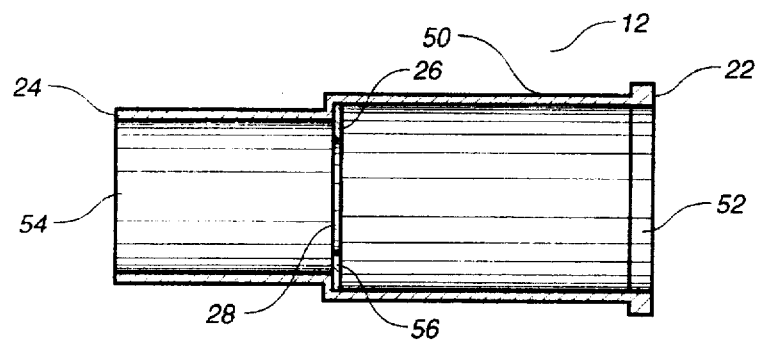
FIG. 2 is a cross-sectional view of the connector of the present invention.

FIG. 2 is a cross-sectional view of the connector 12 of the present invention. Initially, it can be seen that the connector 12 is a body 50 formed of an elastomeric material. The first receptacle 22 is formed at one end of the body 50 while a second receptacle 24 is formed at an opposite end of the body. The seal 26 formed interior of the body 50 generally between the first receptacle 22 and the second receptacle 24. The seal 26 serves to form a generally liquid-tight seal with the surface of a tendon passing through the interior of the body 50. The first receptacle 22 has an orifice 52 formed in one end of the body 50. The orifice 52 has a diameter suitable for generally liquid-tight engagement with the tubular portion 16 of the anchor 14. The orifice 52 has a diameter which is greater than a diameter of the tendon 20. The second receptacle 24 includes an opening 54 which is formed in an opposite end of the body 50. The opening 54 has a diameter suitable for liquid-tight engagement with an exterior surface of the corrosion-protection tube 18. As can be seen in FIG. 2, the orifice 52 in the opening 54 are coaxial. It can also be seen in FIG. 2 that the orifice 52 has a greater diameter than the opening 54.

The seal 26 includes a membrane 56 which is formed interior of the body 50 and extends transverse to a longitudinal axis of the body 50. The membrane 56 includes a central area 28 with a diameter less than an outer diameter of the tendon. Since the diameter of the central area 28 is less than the diameter of the tendon, the membrane 56 will form a liquid-tight seal with the exterior surface of the tendon. The central area 28, in the preferred embodiment of the present invention, is simply a hole formed in the membrane 56. In an alternative embodiment of the present invention, the central area 28 could also be a frangible area formed in the membrane 56. If the central area 28 is frangible, then the tendon, when it is passed through the interior of the body 50, will puncture the frangible central area 28. It can be seen that the first receptacle 22 and the orifice 52 are formed on one side of the membrane 56. The second receptacle 24 and the opening 54 are formed on the opposite side of the membrane 56.

Figure 3:
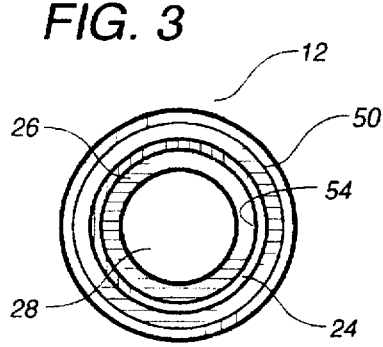
FIG. 3 is a left side end view of the connector of the present invention.

FIG. 3 is an end view of the connector 12 as showing the second receptacle 24. The opening 54 is an annular opening which allows for the easy insertion of the end of the corrosion-protection tube 18. Seal 26 extends into the interior of the body 50. Central area 28 is located centrally of the opening 54.

Figure 4:
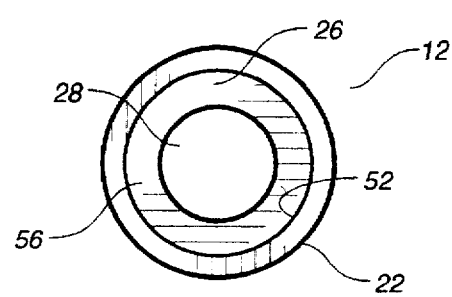
FIG. 4 is a right side end view of the connector of the present invention.

FIG. 4 shows an end view of the connector 12 at the first receptacle 22. The first receptacle 22 includes orifice 52 formed therein. The orifice 52 is an annular area which allows for the easy insertion of the tubular portion 16 of the anchor 14. The seal 26 includes membrane 56 and the central area 28. It can be seen that the central area 28 of the membrane 56 is coaxial and centered in the orifice 52.

Figure 5:
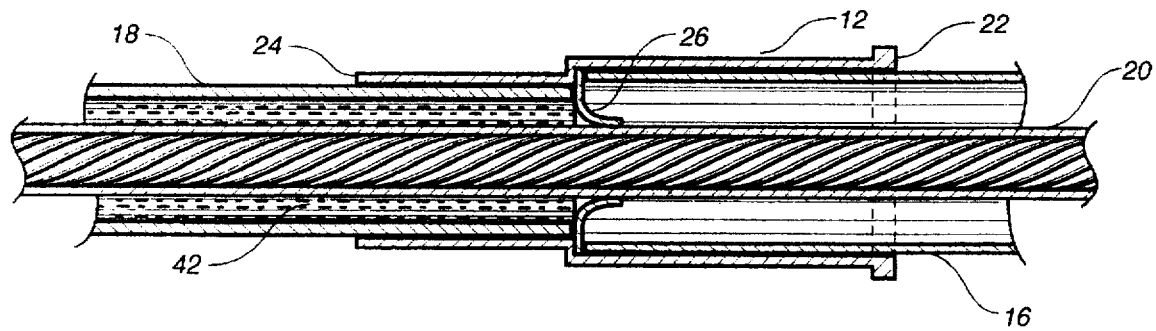
FIG. 5 is a cross-sectional view showing the use of the connector of the present invention in a post-tension system.

FIG. 5 shows a cross-sectional view of how the connector 12 of the present invention serves to join the corrosion-protection tube 18 with the tubular portion 16 of the anchor. FIG. 5 also shows how the tendon 20 extends through the interior of the connector 12.

In particular, in FIG. 5, it can be seen that the corrosion-protection tube 18 is pushed into the interior of the second receptacle 24 until it generally abuts the seal 26. As such, the inner surface of the second receptacle 24 will form a liquid-tight seal with the exterior surface of the corrosion-protection tube 18. The corrosion inhibitor material 42 is contained within the interior of the corrosion-protection tube 18 and on the exterior of the tendon 20.

The tubular portion 16 of the anchor 14 will extend into the first receptacle 22 of the connector 12 and will extend into the interior of the first receptacle 22 until it is generally adjacent to the seal 26. The interior surface of the first receptacle 22 of the connector 12 will form a liquid-tight seal with the exterior surface of the tubular portion 16. It can be seen that the seal 26 sufficiently deflects and deforms so as to form a positive, generally liquid-tight seal with the exterior surface of the tendon 20. As a result of the use of the connector 12, the corrosion-protection tube 18 and the tubular portion 16 of the anchor 14 are placed in close juxtaposition and are retained in a positive sealing manner. The use of the seal 26 serves to prevent the corrosion inhibitor material 42 from leaking out of the corrosion-protection tube 18 and also serves to prevent water from intruding into the interior of the corrosion-protection tube 18.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A post-tension system comprising:

an anchor having a tubular portion extending outwardly therefrom;

a corrosion-protection tube;

a tendon extending through said corrosion-protection tube and through said tubular portion of said anchor; and a connector having a first receptacle formed in one end and a second receptacle formed in an opposite end, said first receptacle receiving said tubular portion therein, said second receptacle receiving said corrosion-protection tube therein, said tendon extending through an interior of said connector, said connector further comprising:

a sealing means formed in said interior of said connector, said sealing means for forming a generally liquid-tight seal with a surface of the tendon, said sealing means comprising a membrane formed in said connector and extending transversely to a longitudinal axis of said connector, said membrane having a central area through which said tendon passes.

2. The system of claim 1, said membrane and said first and second receptacles being integrally formed of an elastomeric material.

3. The system of claim 1, said membrane being interposed between an end of said corrosion-protection tube and an end of said tubular portion of said anchor.

4. The system of claim 1, said first receptacle being affixed in liquid-tight relationship onto said tubular portion, said second receptacle being affixed in liquid-tight relationship onto said corrosion-protection tube.

5. The system of claim 1, said corrosion-protection tube having a smaller diameter than said tubular portion of said anchor.

6. The system of claim 5, said corrosion-protection tube having a corrosion-inhibitor material filling an area between an exterior of said tendon and an interior of said corrosion-protection tube.

7. The system of claim 1, said corrosion-protection tube having a sealing means affixed to an end opposite said connector, said sealing means for forming a generally liquid-tight seal with an exterior surface of the tendon.

8. The system of claim 7, said corrosion-protection tube having a corrosion-inhibitor fluid surrounding said tendon, said sealing means and said connector for retaining said corrosion-inhibitor fluid within said corrosion-protection tube.

9. A post-tension system comprising:

an anchor having a tubular portion extending outwardly therefrom;

a corrosion-protection tube;

a tendon extending through said corrosion-protection tube and through said tubular portion of said anchor;

a connector having a first receptacle formed in one end and a second receptacle formed in an opposite end, said first receptacle receiving said tubular portion therein, said second receptacle receiving said corrosion-protection tube therein, said tendon extending through an interior of said connector, said first receptacle being slidably received on said tubular portion of said anchor, said second receptacle being slidably received onto said corrosion-protection tube; and a membrane formed in said connector and extending transversely to a longitudinal axis of said connector, said membrane having a central area through which said tendon passes, said membrane being interposed between an end of said corrosion-protection tube and an end of said tubular portion of said anchor.

* * * * *